United States Patent
Hoogenboom et al.

(10) Patent No.: US 6,934,253 B2
(45) Date of Patent: *Aug. 23, 2005

(54) ATM SWITCH WITH RATE-LIMITING CONGESTION CONTROL

(75) Inventors: Chris L. Hoogenboom, Channel Islands Harbor, CA (US); Michael J. Nishimura, Torrance, CA (US); John D. Wallner, Calabasas, CA (US); Todd L. Khacherian, Moorpark, CA (US); Michael K. Wilson, Thousand Oaks, CA (US)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 32 days.

(21) Appl. No.: 09/006,777

(22) Filed: Jan. 14, 1998

(65) Prior Publication Data

US 2002/0054568 A1 May 9, 2002

(51) Int. Cl.[7] .............................................. G08C 15/00
(52) U.S. Cl. ........................ 370/232; 370/413; 370/235
(58) Field of Search ................................ 370/229–240, 370/252, 253, 389, 392, 395, 412–418, 465, 468, 395.1, 395.7, 466

(56) References Cited

U.S. PATENT DOCUMENTS

| | | | | |
|---|---|---|---|---|
| 5,444,706 A | * | 8/1995 | Osaki | 370/230 |
| 5,448,559 A | * | 9/1995 | Hayter et al. | 370/398 |
| 5,497,375 A | * | 3/1996 | Hluchyj et al. | 370/232 |
| 5,530,695 A | * | 6/1996 | Dighe et al. | 370/232 |
| 5,726,977 A | * | 3/1998 | Lee | 370/235 |
| 5,754,529 A | * | 5/1998 | Heiss | 370/232 |
| 5,768,257 A | * | 6/1998 | Khacherian et al. | 370/229 |
| 5,774,453 A | * | 6/1998 | Fukano et al. | 370/231 |
| 5,910,942 A | * | 6/1999 | Grenot et al. | 370/236 |
| 5,946,297 A | * | 8/1999 | Calvignac et al. | 370/230 |
| 6,046,981 A | * | 4/2000 | Ramamurthy et al. | 370/232 |
| 6,122,251 A | * | 9/2000 | Shinohara | 370/231 |
| 6,324,165 B1 | * | 11/2001 | Fan et al. | 370/232 |
| 6,490,248 B1 | * | 12/2002 | Shimojo | 370/229 |

OTHER PUBLICATIONS

ATM Forum Technical Committee TrafficeManagement Specification, Version 4.0, af–tm–0056.000, Apr. 1996.

* cited by examiner

*Primary Examiner*—Chi Pham
*Assistant Examiner*—Keith M. George
(74) *Attorney, Agent, or Firm*—Michael Blaine Brooks PC; Craig A. Hoersten; V. Laurence Sewell

(57) ABSTRACT

An ATM switch with rate-limiting congestion control has a plurality of input ports, a plurality of output ports operatively associated with one or more data buffers, an output control and a switch fabric for switching data units from any of the input ports to any of the output ports on virtual connections. The ATM switch imposes and enforces transmission rate-limiting policies against the virtual connections when the backlog of data units for delivery to a particular output port reaches a particular level. The ATM switch may be arranged to exempt high priority data units from the imposed rate limitations and has a means to lift the rate limitations when the backlog has been sufficiently reduced.

47 Claims, 7 Drawing Sheets

ATM SWITCH WITH RATE-LIMITING CONGESTION CONTROL

BACKGROUND OF THE INVENTION

The present invention relates to flow control in ATM switches and, more particularly, to methods and devices for fairly allocating bandwidth during peak traffic periods among the virtual connections sharing the output resources of ATM switches.

An asynchronous transfer mode (ATM) switch accepts cells from many source input ports and routes them to many destination output ports. An ATM switch may be hardware-based or software-based. The architecture can be generalized as shown in FIG. 1. Cells arrive on input ports $IP_0$ to $IP_N$ and are switched through a switch fabric 100 to various ones of output ports $OP_0$ to $OP_N$. Each cell is transmitted on a virtual connection, "VC" for short, a plurality of which share the resources of the input ports and output ports.

A significant technical challenge facing ATM switch designers is how to allocate the output port bandwidth of an ATM switch during peak traffic periods. During such periods, the rate at which cells destined for a particular output port arrive at the aggregate of input ports may far exceed the bandwidth of the output port. This excess demand for output port bandwidth creates the need to temporarily buffer cells. Even with buffering, cell backlog may exceed buffer capacity, requiring cells to be dropped. And even if buffer capacity is sufficient, the buffered cells may face protracted delays. Thus, many ATM switches implement congestion control strategies designed to reduce cell drop and cell delay and ensure that the most critical cells are delivered in a timely manner.

Various congestion control strategies have been implemented, including input buffering with input control, output buffering with output control and dynamic input buffering with output control, or DIBOC. "Control" in this context typically refers to, among other things, a priority- and/or port-based cell release algorithm defining the order in which buffered cells are allocated output port bandwidth. In a DIBOC-based ATM switch, for example, each arriving cell is buffered at an input. An input control unit then generates and transmits a "Request" asking permission to release the cell to the destination output. The destination output monitors its bandwidth availability and eventually responds to the "Request" with a "Grant" permitting the input to release the cell. The order in which "Grants" are issued is typically governed by a policy-based cell release algorithm. Particularly advantageous DIBOC-based switches and cell release algorithms which grant "Requests" based on cell priority while treating inputs generally as peers, are taught in Khacherian, et al., application Ser. No. 08/679,360 filed Jul. 11, 1996, which is assigned to the assignee hereof.

While priority- and port-based congestion control strategies have proven useful in ameliorating some output port bandwidth allocation problems experienced in ATM switches during peak traffic periods, such strategies have failed to provide a complete solution. In real-world ATM switches, output port congestion is often caused at the connection level by the high-rate flooding of non-critical cells on a single or a small number of "problem" virtual connections. Unless the tide of cells transmitted on such "problem" virtual connections is successfully stemmed, cells transmitted on other virtual connections sharing output port resources with the "problem" virtual connections may be dropped at an unacceptable rate, or suffer unacceptable delays. This cell flooding problem may be detrimental to all virtual connections which must share output port resources with a "problem" virtual connection but may be particularly problematic for virtual connections in DIBOC-based ATM switches which must share input port resources with a "problem" virtual connection and, therefore, must compete directly with the "problem" virtual connection for both buffer space and output port bandwidth.

One way the prior art has addressed the issue of "problem" virtual connections is by separately buffering inbound cells by virtual connection, "problem" or not, and treating all virtual connections generally as peers for purposes of allocating output port bandwidth. While such "per VC queueing" strategies may be suitable in ATM switches which service a relatively small number of virtual connections, the requirement of buffering cells on a "per VC" basis means that "per VC queueing" does not scale well to ATM switches in which the number of virtual connections is relatively large. Accordingly, a need has arisen for a connection-based congestion control strategy which address the output port bandwidth allocation problems caused by "problem" virtual connections without introducing the known scalability problems of "per VC queueing".

SUMMARY OF THE INVENTION

In its most basic feature, the present invention addresses the problem of connection level unfairness in the allocation of ATM switch output port bandwidth without "per VC queueing" by implementing rate-based filtering. An ATM switch has a plurality of input ports, a plurality of output ports and a switch fabric. Each output port has a plurality of operatively associated data stores and an associated output control. The switch fabric has an input side and an output side for switching data units from any of the input ports to any of the output ports. Inbound data units destined for a particular output port are temporarily buffered, if necessary, within a data store operatively associated with the destination output port. The output control associated with the destination output port monitors the backlog of data units buffered in association with the destination output port and, if the backlog of data units is sufficiently large, imposes a rate limitation which, generally speaking, limits the rate at which additional data units will be accepted for buffering.

In another aspect of the invention, data units with different characteristics, such as different priority, source input port or destination output port, are buffered within operatively distinct data stores, and rate limitations are imposed based on the backlog at one or more stores.

In another aspect of the invention, rate limitations result in filtering decisions being made against data units based on different characteristics, such as priority, source input port and destination output port.

In another aspect of the invention, a "leaky bucket" algorithm is implemented as the rate limitation so that "bursty" low priority traffic is selectively filtered.

In another aspect of the invention, rate limitations are lifted once the backlog of data units at the particular one or more of stores has been sufficiently reduced.

It will be appreciated that through the expedient of rate-limiting congestion control, "problem" virtual connections are prevented from "stuffing" particular data stores with non-critical traffic at the expense of other virtual connections. Therefore, output port resources are allocated more fairly among all virtual connections without introducing the scalability problems associated with "per VC queueing". Furthermore, by exempting data units having a relatively high priority from the rate limitations, critical data flows are not inhibited.

In a preferred embodiment of the present invention, rate-limiting congestion control is implemented in a DIBOC-based ATM switch having a plurality of input ports, a plurality of output ports and a switch fabric, wherein each input port has an associated input control and each output port has an associated output control and a plurality of operatively associated data stores. The data stores are physically associated with input ports. The switch fabric has an input side and an output side for switching data from any of the input ports to any of the output ports. Inbound data units destined for a particular output port are temporarily buffered, if necessary, within a data store operatively associated with the destination output port, and the input control generates for each buffered data unit a "Request" to release the data unit to the destination output port. The "Requests" are transmitted to the output control associated with the destination output port, which through receipt of the "Requests" monitors the backlog of data units buffered in association with the destination output port and, if the backlog of data units is sufficiently large, imposes a rate limitation which, generally speaking, limits the rate at which additional data units will be accepted for buffering at the input port.

The present invention can be better understood by reference to the following detailed description, taken in conjunction with the accompanying drawings which are briefly described below. Of course, the actual scope of the invention is defined by the appended claims.

DETAILED DESCRIPTION OF THE PREFERRED EMBODIMENT

Figure 1:
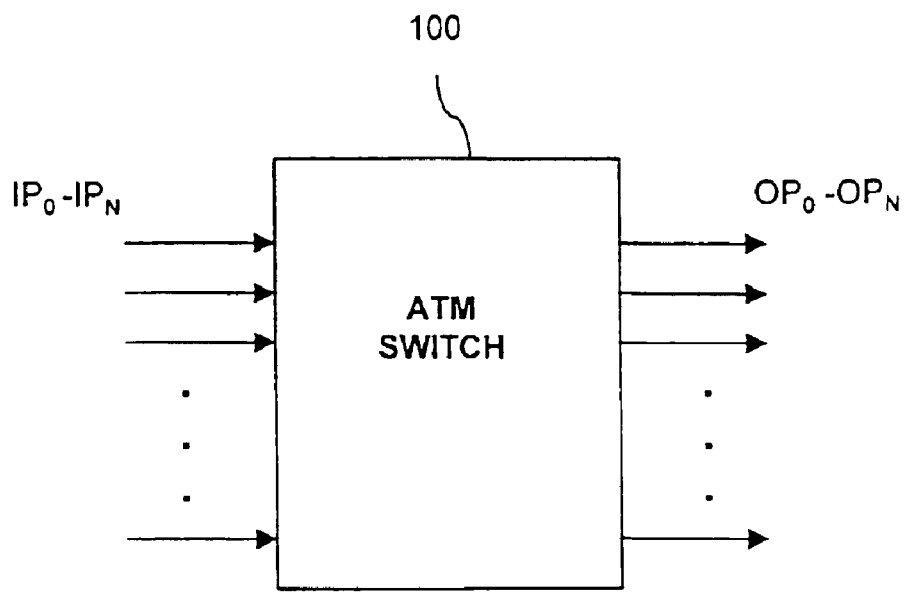
FIG. 1 is a generalized block diagram of an ATM switch in which the present invention may be implemented.

The present invention applies to an ATM switch 100 having an architecture generalized as shown in FIG. 1.

Figure 2:
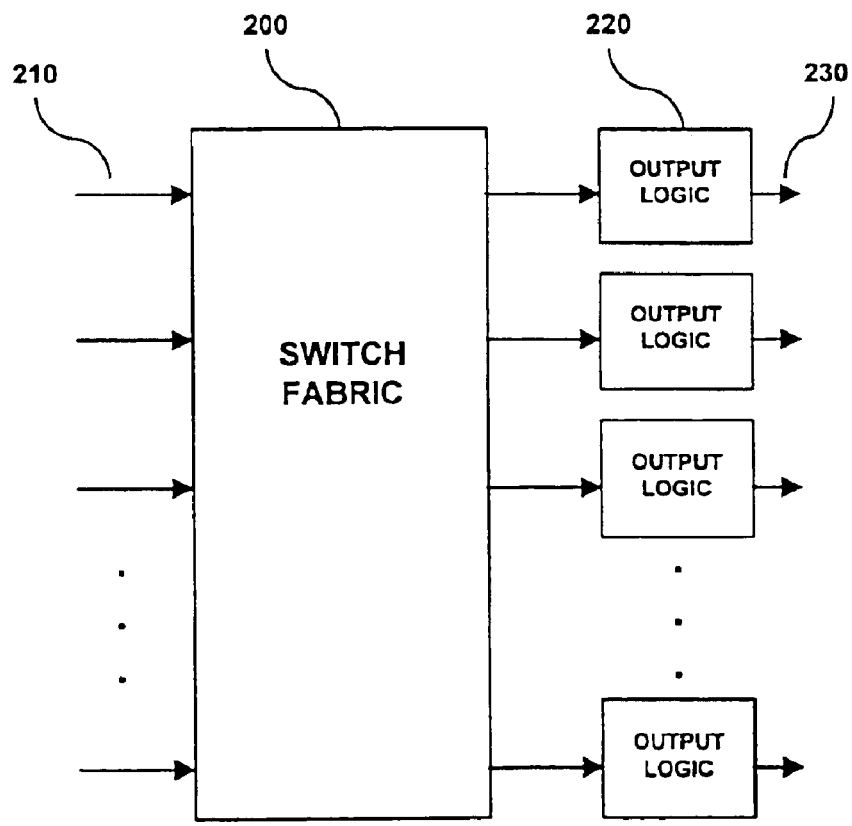
FIG. 2 is a block diagram of an ATM switch with output buffering and output control in which the present invention may be implemented.

Various types of congestion control strategies may be implemented in such an ATM switch, including output buffering with output control and input buffering with output control (DIBOC), utilizing a variety of data release algorithms. In FIG. 2, an ATM switch with output buffering and output control in which the present invention may be implemented is shown having a switch fabric 200 providing a full mesh of physical connections between input ports 210 and output ports 230 for supporting virtual connections. Each one of output ports 230 has associated therewith one of output logic units 220. At any given time, a subset or all of the input ports 210 receives data units destined for a subset or all of the output ports 230. Data units may therefore be imagined as flowing from left to right, from input ports 210 to output ports 230, on virtual connections.

Figure 3:
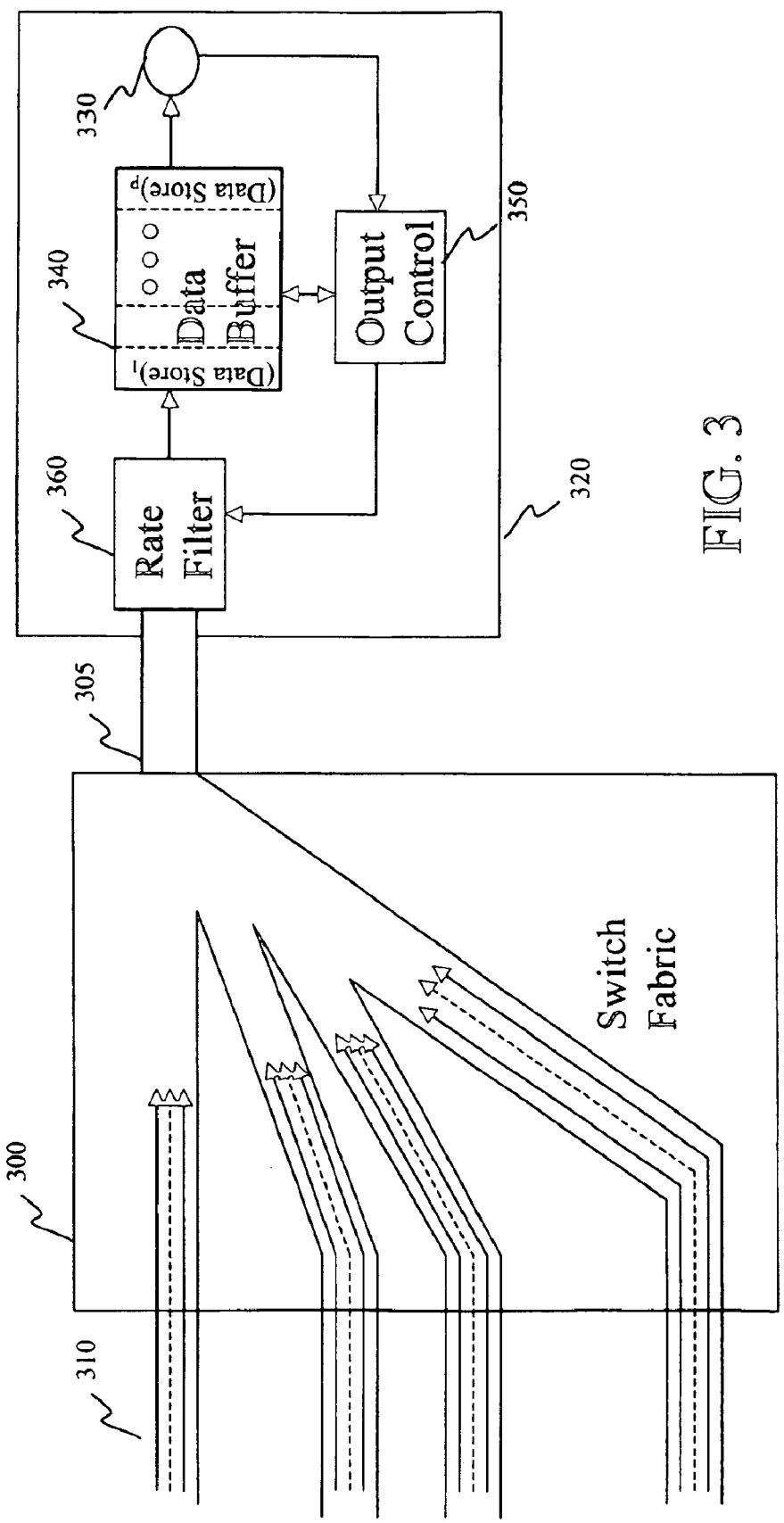
FIG. 3 is a block diagram showing the data flow and congestion control flow in an ATM switch with output buffering and output control in accordance with a preferred embodiment of the present invention.

Referring now to FIG. 3, an ATM switch with output buffering and output control is shown in greater detail. Switching fabric 300 is fed by input ports 310 which at different times during an operational cycle support different virtual connections carrying data units at different rates. Input ports 310 are arranged to feed a plurality of output logic units, only one of which is shown. It will be appreciated that in general data units may flow on virtual connections from all input ports 310 to all output logic units via switching fabric 300 as described herein with respect to particular output logic unit 320. Output logic unit 320 includes data buffer 340 which feeds output port 330, and output control 350 and rate filter 360. Data buffer 340 has operatively distinct stores for buffering data units according to their particular characteristics, such as priority. For a switch supporting P levels of priority, data buffer 340 preferably has P stores for separately buffering data units for each particular priority. Output control 350 segregates unfiltered data units received on line 305 for storage within one of the P stores and controls release of the buffered data units from the P stores to output port 330 in a manner described herein.

In order to implement an appropriate priority-based congestion control strategy and an appropriate connection-based congestion control strategy in the ATM switch according to FIG. 3, output control 350 must know the present backlog of data units the P stores in data buffer 340. For this purpose, P physical memories are provided within output control 350. Each time a data unit is buffered in one of the P stores within data buffer 340, output control 350 increments a backlog value in a memory corresponding to the store so that the current backlog of data units stored in each store is determinable by output control 350 by reference to the incremented value. If desired, output control 350 may maintain a global backlog value reflecting the aggregate backlog of data units awaiting access to output port 330.

Figure 6A:
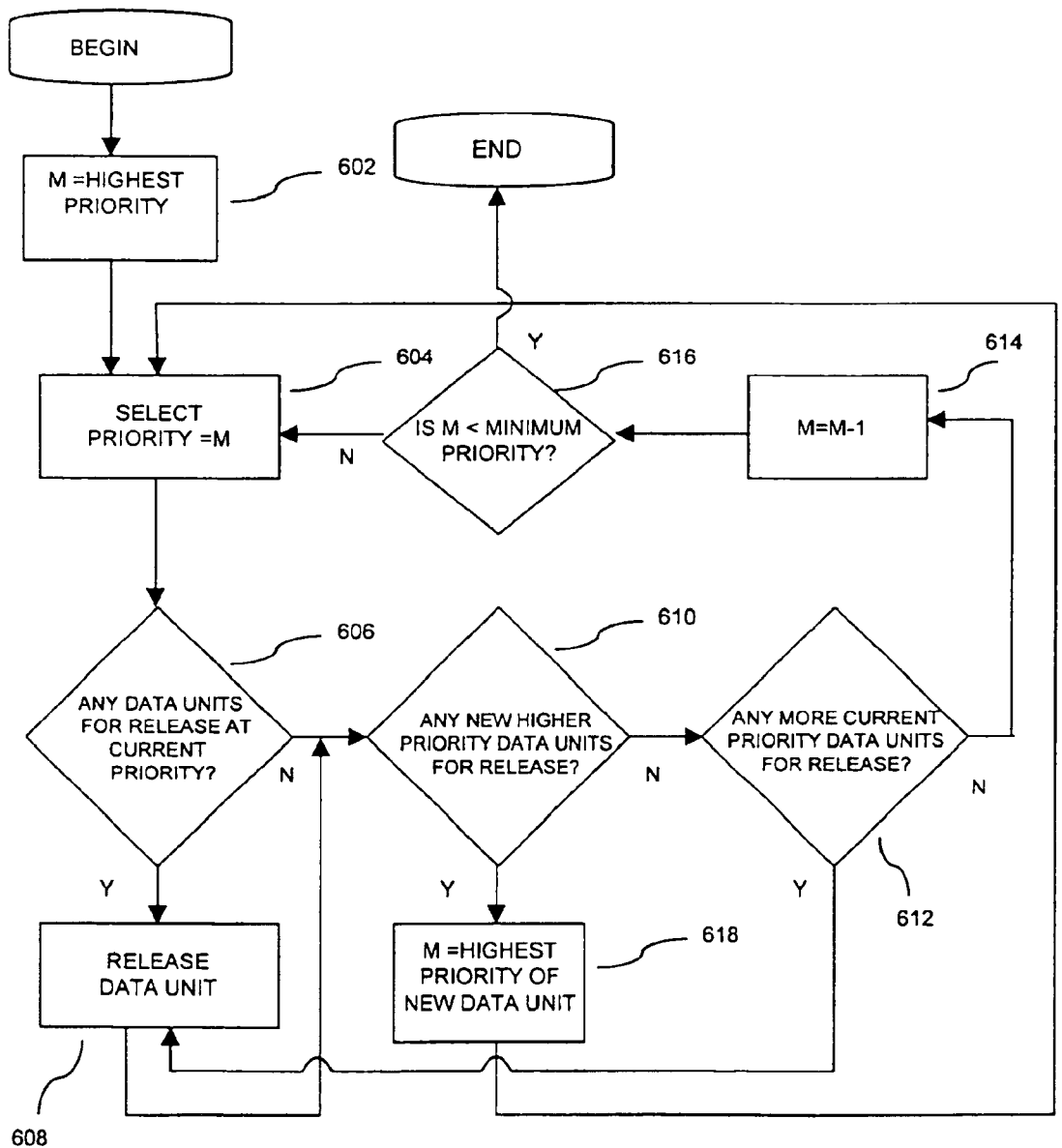
FIG. 6A is a flow chart describing a priority-based congestion control strategy implemented by an output logic unit in an ATM switch with output buffering and output control in accordance with a preferred embodiment of the invention.

The basic priority-based congestion control strategy implemented by output logic unit 320 may be described by reference to FIG. 6A. Output control 350 has a priority counter initially set to the highest priority (602). Output control 350 has a line on output port 330 to monitor available bandwidth. If bandwidth is available, the priority is selected (604) and output control 350 checks the corresponding memory to determine if a data unit is buffered in the store corresponding to the current priority (606). If a data unit is buffered at the current priority, it is released to output port 330 (608) and the backlog value of the corresponding memory is decremented. If more than one data unit is buffered at the current priority, the first-received data unit is preferably released. Assuming no new data unit having a higher priority than the current priority has been buffered (610), output control 350 next checks the memories to determine if any more data units are buffered at the current priority (612). If more data units are buffered at the current priority, the release step 608 is repeated. If no more data units are buffered at the current priority, the priority counter is decremented (614) and, assuming the new priority is a valid priority (616), the new (lower) priority is selected (604) and the memory check of step 606 is repeated at the new priority. If any check at step 608 reveals that a new data unit having a higher priority than the current priority has been received, the priority counter is set to the new priority (618) and step 604 is repeated. The priority-based congestion control algorithm is terminated when any check at step 616 reveals an invalid priority, indicating that no more data units are buffered at any priority. From the foregoing it should be clear that the described priority-based congestion control strategy may be characterized, generally speaking, as first-in, first out (FIFO) within priority. This strategy advantageously prevents virtual connections which flood output ports with low priority traffic from blocking high priority traffic. It does not, however, prevent such "problem" virtual connections from consuming all or substantially all of the "turns" allocated by the output logic units to low priority traffic. Without a successful connection level congestion control strategy to compliment the above-described priority-based congestion control strategy, the problem of one or more "problem" virtual connections "stuffing" output port stores assigned to a particular priorities and preventing traffic carried on other virtual connections from getting through may persist. The present invention addresses this "stuffing" problem with a novel connection-based congestion control strategy described herein.

Figure 7A:
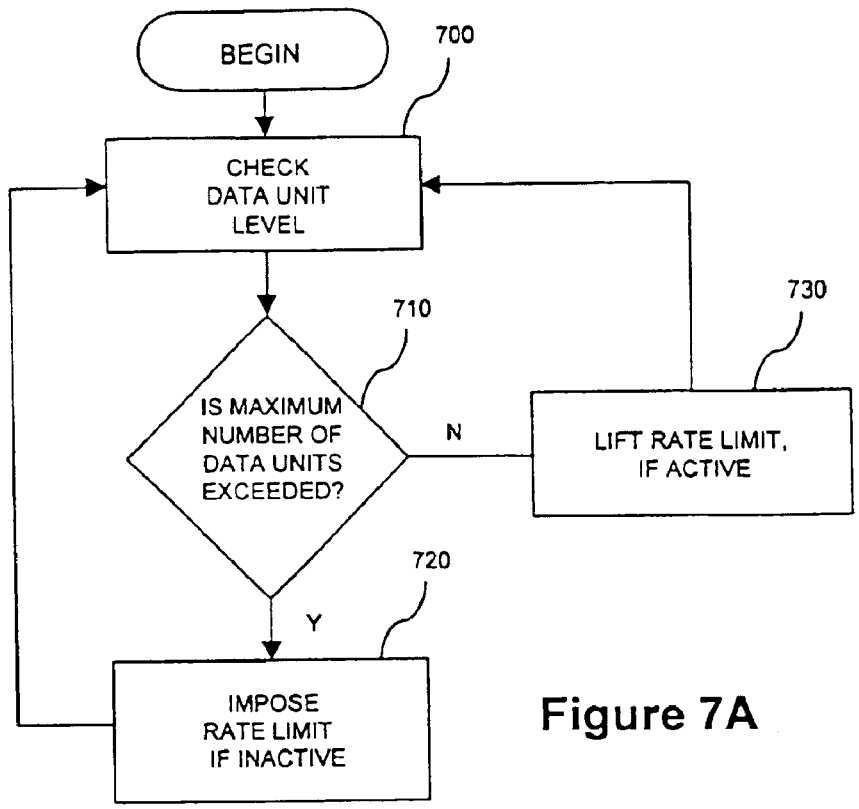
FIG. 7A is a flow chart describing a connection-based congestion control strategy implemented by an output logic unit in an ATM switch with output buffering and output control in accordance with a preferred embodiment of the invention.

The basic connection-based congestion control strategy implemented by output logic unit 320 in may be described by reference to FIG. 7A. Whenever a data unit is added to data buffer 340, output control 350 increments the backlog value of the corresponding store. Output control 350 monitors the P backlog values (700) and compares any one, any desired combination, or all of the backlog values with selected maximum values to determine if a maximum value has been exceeded (710). If a maximum value has been exceeded and a rate limitation is not presently being enforced by rate filter 360, output control 350 imposes a rate limitation by transmitting an "activate congestion control" signal to rate filter 360. If a maximum value has not been exceeded and a rate limitation is presently being enforced by rate filter 360, output control 350 lifts the rate limitation by transmitting a "deactivate congestion control" signal to rate filter 360. In either event, the monitoring process is performed in a closed feedback loop so that the rate-limiting decisions are at all times made based on the most current backlog information. It will be appreciated that by the expedient of keeping separate backlog values for each priority, rate limitations may be imposed based on consideration of the backlog of buffered data units for any priority. Of course, the aggregate backlog in data buffer 340 may also be used as the triggering criterion for imposing and lifting rate limitations.

Rate limitations may take various forms and are preferably policy-based. By way of example, a rate limitation may cause rate filter 360 to enforce an absolute maximum rate at which data units carried on virtual connections will be accepted for buffering, or may cause rate filter 360 to act as a continuous-state "leaky bucket" which allows relatively small and infrequent "bursts" of high-rate data carried on virtual connections to be accepted. One "leaky bucket" algorithm which may be advantageously implemented on output logic unit 320 is the Generic Cell Rate Algorithm (GCRA) described in the ATM Forum Technical Committee's Traffic Management Specification Version 4.0, atmf95-0012R10, at Section 4.4.2 (1995). Rate limitations may also be selectively enforced by rate filter 360 according to data unit characteristics, such as priority. By way of example, in the case of priority, a rate limitation may be enforced only against less critical unspecified bit rate (UBR) and available bit rate (ABR), while more critical constant bit rate (CBR) and variable bit rate (VBR) data units may be exempted. Whatever the particulars, rate limitations may advantageously be imposed and enforced to force "problem" virtual connections to either conform their traffic flows to the current rate limitation or have their traffic dropped. The decision as to whether and, if so, how to bring traffic flows into compliance with rate limitations may, of course, be made externally to the ATM switch by the nodes attempting to communication on the "problem" virtual connections whose traffic is affected.

Figure 4:
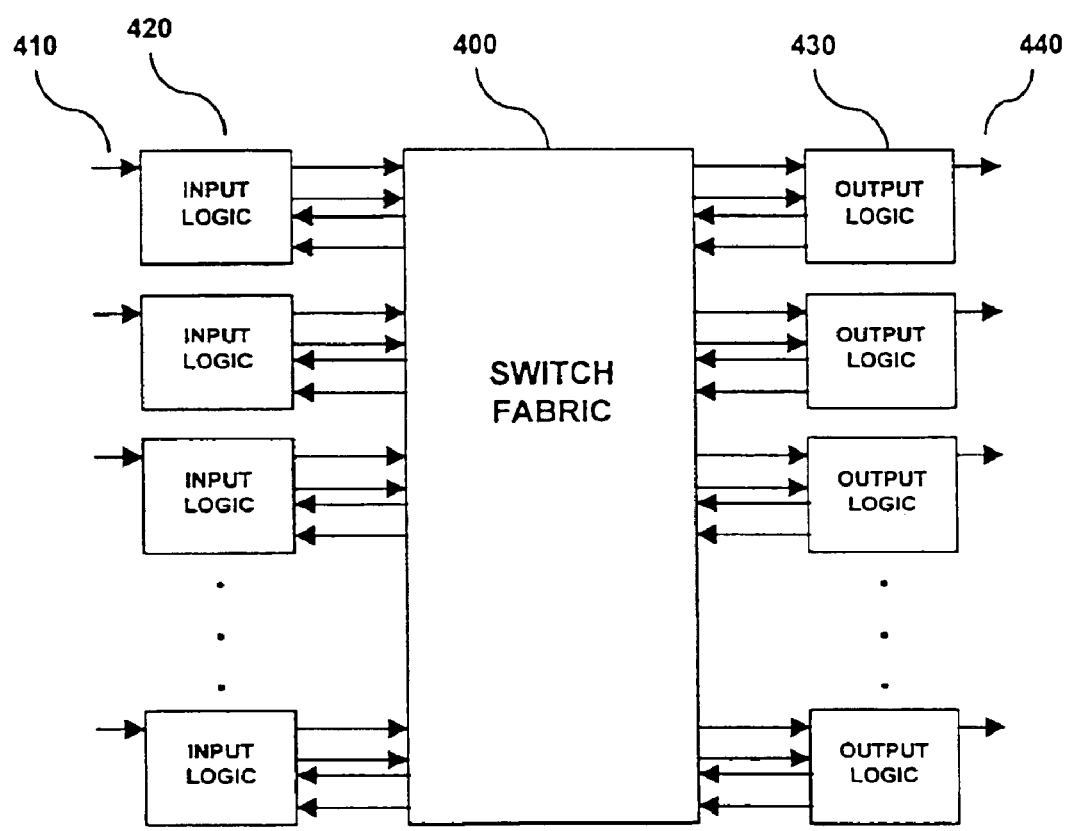
FIG. 4 is a block diagram of a DIBOC-based ATM switch in which the present invention may be implemented.

Referring now to FIG. 4, in a more preferred embodiment of the invention, a DIBOC-based ATM switch is shown having a switch fabric 400 providing a full mesh of physical connections between a plurality of input ports 410 and a plurality of output ports 440. Each one of input ports 420 has associated therewith one of input logic units 420 and each of output ports 440 has associated therewith one of output logic units 430. As in the previous embodiment, data units can be imagined flowing through the switch fabric 400 from left to right, from a subset or all of the input ports 410 to a subset or all of the output ports 440. However, in the more preferred embodiment, data buffering is performed at input logic units 420 which exchange "handshaking" signals with output logic units 430 before releasing data units to output ports 440. Output logic units 430 also transmit to input logic units 420 congestion control signals to impose rate limitations for enforcement by input logic units 420.

Figure 5:
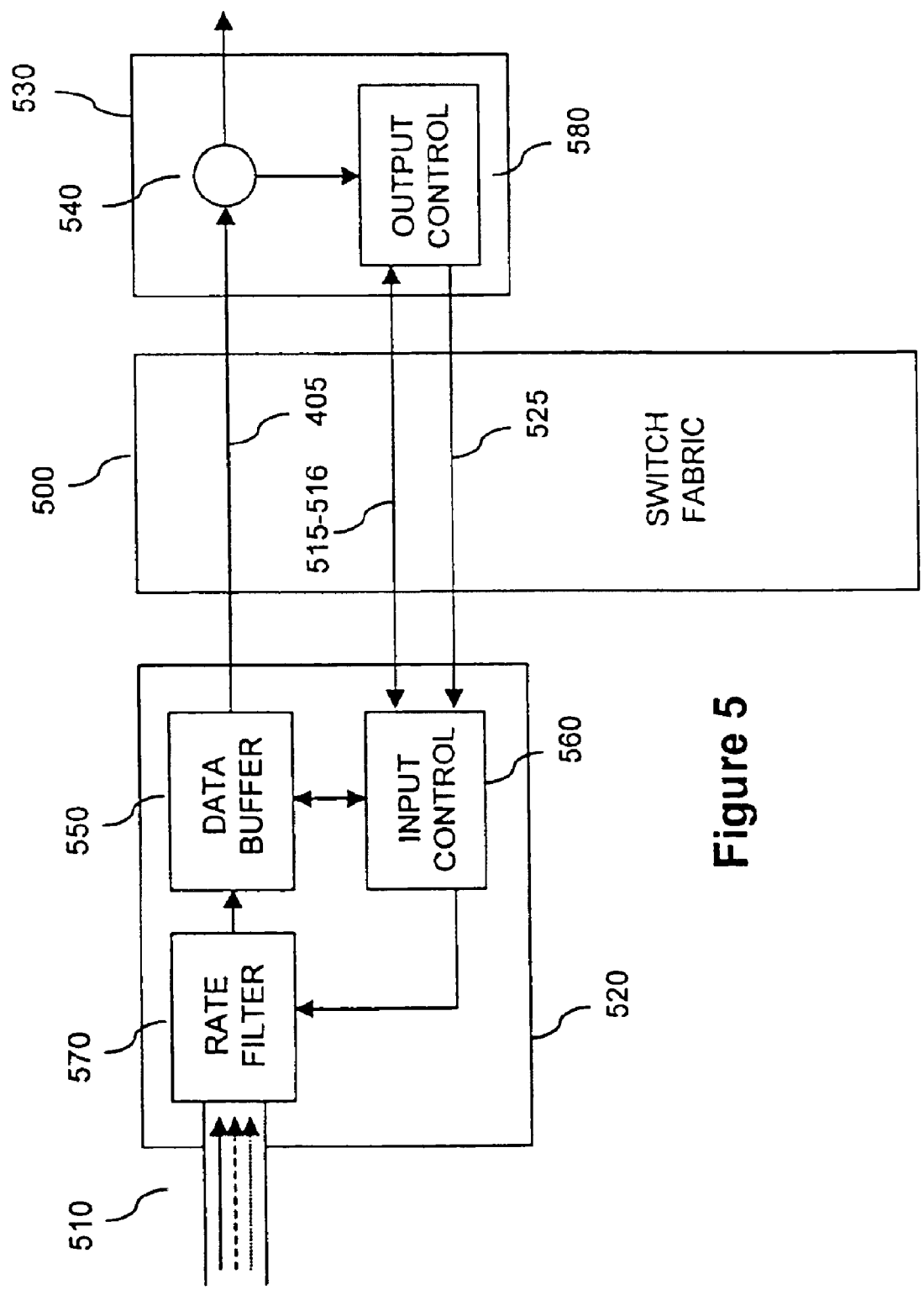
FIG. 5 is a block diagram showing the "Request" and "Grant" flow, the data flow and the congestion control flow in a DIBOC-based ATM switch in accordance with a more preferred embodiment of the invention.

Turning now to FIG. 5, the flows between any input port and output port in a DIBOC-based ATM switch in accordance with the more preferred embodiment are generalized by reference to the flows between input port 510 and output port 540. Input logic unit 520 is fed by input port 510, which may at different times in an operational cycle support different virtual connections delivering data units at different rates. Input logic unit 520 is arranged to feed output logic unit 540. Input logic unit 520 includes a data buffer 550 which feeds output port 540, and an input control 560 and rate filter 570. Output logic unit 530 includes an output control 580 which monitors the bandwidth at output port 540. Data buffer 550 has operatively distinct stores for buffering data units according to different characteristics, such as destination output port and priority. For a switch having O output ports and supporting P levels of priority, data buffer 550 preferably has O×P stores for separately buffering data units for any destination output port and priority combination, and P stores for separately buffering data units for a particular destination output port and any priority. Input control 560 segregates unfiltered data units received at input port 510 for storage within one of its O×P stores, and more particularly within one of the P stores associated with the destination output port. Upon prompting from the output logic unit associated with the destination output port, input control 560 eventually releases the buffered data units from the store to the destination output port. In a DIBOC-based ATM switch with I input ports, there will, naturally, be in the aggregate I×P stores associated with a particular destination output port and any priority.

A DIBOC-based ATM switch in accordance with the more preferred embodiment of the invention advantageously implements priority/port-based and a connection-based congestion control strategy. For that purpose, output control 580 must know the present backlog of data units buffered in the P stores in data buffer 550 corresponding to output port 540, and must know more generally backlog in the I×P stores in the aggregate of data buffers corresponding to output port 540. Output control 580 therefore has I×P physical memories. Each time a data unit is buffered in one of the P stores within data buffer 550 which corresponds to output port 540, output control 580 increments a backlog value in a memory corresponding to the store so that the current backlog of data units stored in each of the P stores is determinable by output control 580 by reference to the incremented values. More generally, each time a data unit is buffered in one of the I×P stores within one of the data buffers, output control 580 increments a backlog value in the corresponding memory. Input control 560 obtains buffering information through the transmission of "Requests". Thus, in the case of a flow from input port 510 to output port 540, input control 560 monitors data buffer 550 and for each buffered data unit destined for output port 540 transmits on line 515 a "Request" to release the data unit, which specifies the source input port and priority of the data unit. Output control 580 increments a value in the memory which corresponds to the specified source input port and priority.

Figure 6B:
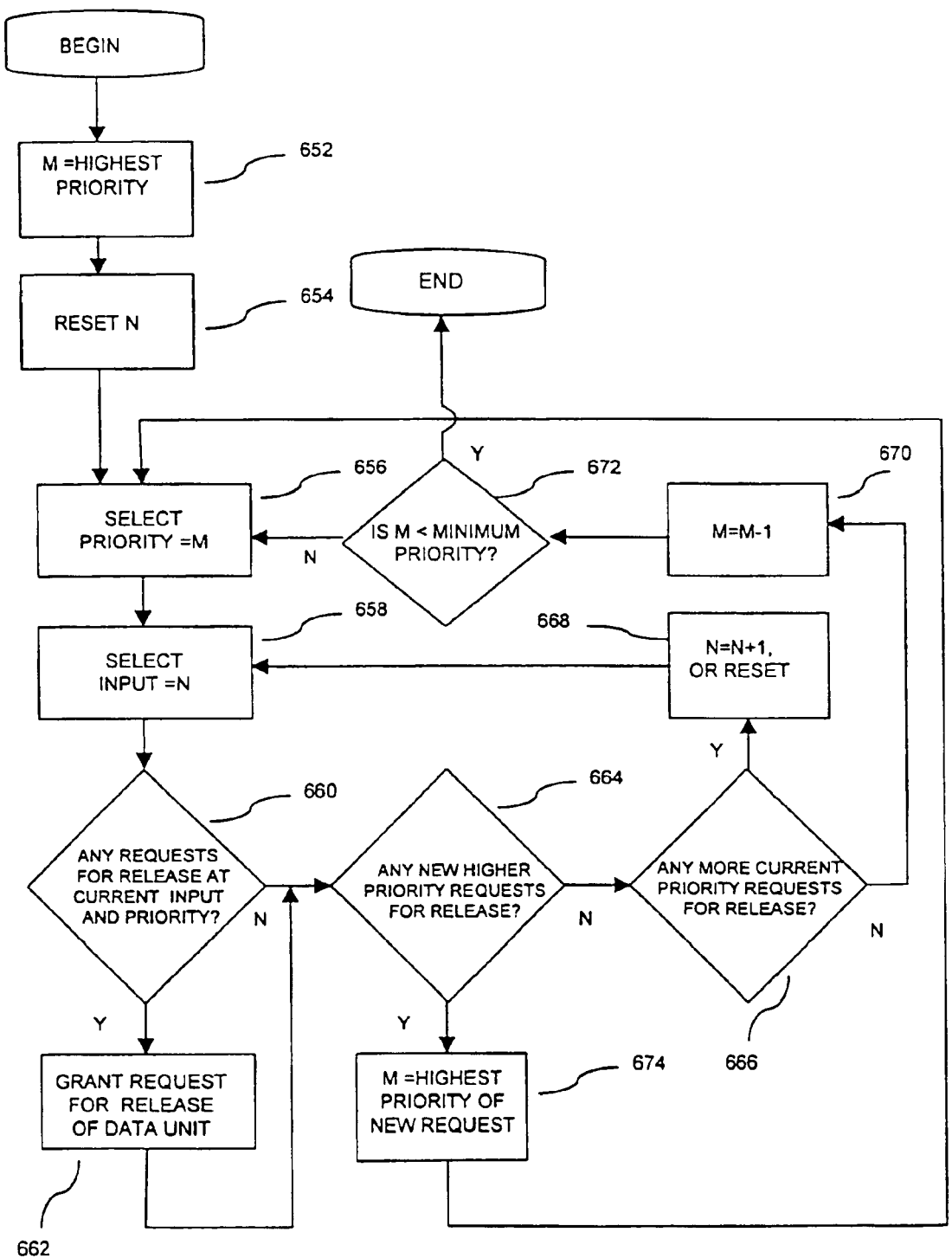
FIG. 6B is a flow chart describing a priority/port-based congestion control strategy implemented by an output logic unit in an DIBOC-based ATM switch in accordance with a more preferred embodiment of the invention.

The basic priority/port-based control strategy implemented by output control 580 proceeds as described in FIG. 6B. Output control 580 has a priority counter initially set to the highest priority (652) and an input port counter initially set to a first one of input ports (654). Output control also has a line on its associated output port 530 to monitor available bandwidth. If bandwidth is available, a priority and input port are selected (656 and 658). For simplicity, it will be assumed that input port 510 is selected first. Thus, output control 580 checks the memory location corresponding to input port 510 and the selected priority to determine if an unacknowledged "Request" has been received on line 515 (660). If a "Request" has been received, output control 580 issues a "Grant" to input control 560 on line 516 instructing input control 560 to control data buffer 550 and release to output port 540 on line 505 the data unit from the corresponding store. Output control 580 also decrements the backlog value of the corresponding memory location. Assuming no new "Requests" having a higher priority than the current priority have been received (664), output control 580 checks the memory to determine if any more unacknowledged "Requests" have been received at the current priority (666). If more "Requests" have been received at the current priority, the input port counter is incremented (or reset if the new value is not valid for an input port) (668), the new input port is selected (668) and the memory check of step 660 is repeated at the current priority and new input. If no more unacknowledged "Requests" have been received at the current priority, the priority counter is decremented (670), the new (lower) priority is selected (656) and, assuming the new priority is a valid priority (672), the memory check of step 660 is repeated at the new priority and current input. If any check at step 664 reveals that a new "Request" having a higher priority than the current priority has been received, the priority counter is set to the new priority and step 656 is repeated. The buffer control process is terminated if any check at step 622 reveals an invalid priority. From the foregoing it should be clear that the priority/port-based control strategy just described may be characterized, generally speaking, as round-robin by input port within priority. This strategy not only prevents virtual connections which flood output ports with low priority traffic from blocking high priority traffic, its round-robin feature also prevents such "problem" virtual connections from consuming all of the "turns" allocated at the output ports to low priority traffic. However, it does not prevent "problem" virtual connections from consuming all or substantially all of the "turns" allocated to any particular input port within the round-robin scheme. A solution to this problem is once again afforded by a novel connection level congestion control strategy.

Figure 7B:
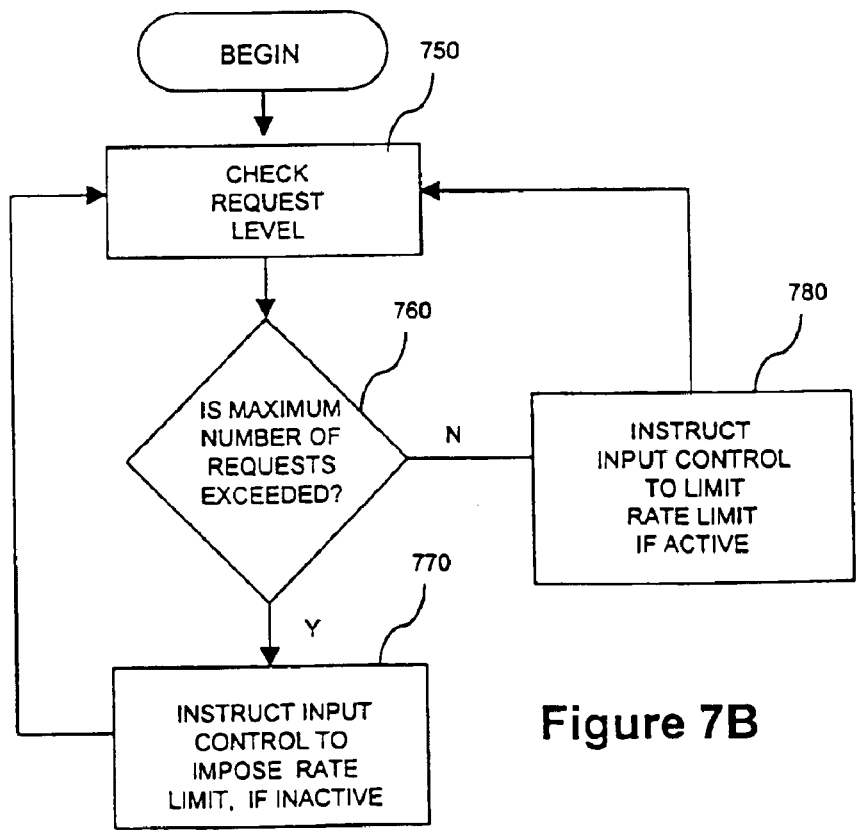
FIG. 7B is a flow chart describing a connection-based congestion control strategy implemented by an output logic unit in a DIBOC-based ATM switch in accordance with a more preferred embodiment of the invention.

The basic connection-based congestion control strategy, in the more preferred embodiment, may be described by reference to the interaction of input logic unit 520 and output logic unit 530 and is illustrated in FIG. 7B. Whenever a data unit is added to data buffer 550, input control 560 transmits a "Request" to output control 580. Output control 580 increments the backlog value of the appropriate one of I×P stores. Output control 580 monitors the I×P backlog values (700) and compares any one, any desired combination, or all of the monitored backlog values with selected maximum values to determine if a maximum value has been exceeded (710). If a maximum value has been exceeded and a rate limitation is not presently being enforced by rate filter 570, output control 580 transmits an "activate congestion control" signal to input control 560 on line 525 instructing input control 460 to have rate filter 570 enforce a rate limitation. If a maximum value has not been exceeded and a rate limitation is presently being enforced by rate filter 570, output control 580 transmits a "deactivate congestion control" signal to input control 560 on line 525 instructing input control 560 to have rate filter 570 lift the rate limitation. In either event, the monitoring process is again performed in a closed loop with feedback so that rate-limiting decisions are based on the most current backlog information.

Rate limitations enforced by rate filter 570 may take various forms in the more preferred embodiment, such as those already described in the previous embodiment. Alternatively, rate limitations may be selectively enforced in the more preferred embodiment according to input port. For example, a rate limitation may be enforced only against the virtual connections delivering data units via the input port whose backlog triggered the rate limitation, while other virtual connections are unaffected. If it is desired to enforce a rate limitation globally at all input ports, an "activate congestion control" signal instructing input controls to impose the rate limitation may be broadcast to all input controls, whereas if it is desired to selectively enforce a rate limitations at particular input ports, an "activate congestion control" signal may be unicast to the particular input port, or multicast to the particular input ports at which enforcement is desired. Alternatively, all congestion control signals may be broadcast with instruction sets with interpretation and enforcement left to input controls.

It will be appreciated by those of ordinary skill in the art that the invention can be embodied in other specific forms without departing from the spirit or essential character thereof. The present description is therefore considered in all respects to be illustrative and not restrictive. The scope of the invention is indicated by the appended claims, and all changes that come within the meaning and range of equivalents thereof are intended to be embraced therein.

We claim:

1. A DIBOC-based ATM switch, comprising:
   a plurality of input ports for receiving data units on virtual connections, each input port physically associated with a plurality of data stores and an input control for transmitting "Requests" to release data units;
   a plurality of output ports, each output port operatively associated with the plurality of the data stores and physically associated with an output control for monitoring "Requests" to release data units;

a switch fabric for switching data units for any of the input ports to any of the output ports; and a rate filter adapted to filter data units from the data stores in response to the output controls;

wherein the data stores are arranged to buffer data units for delivery to their associated output port, and the output controls are arranged to monitor the backlog of buffered data units for delivery to their associated output ports, through information transmitted in "Requests" and, if the backlog reaches a particular level, to enforce a rate limitation against additional data units for delivery to their associated output ports, wherein the additional data units in violation of the rate limitation are filtered by the rate filter.

2. The ATM switch according to claim 1, wherein each data store buffers data units having a distinct priority.

3. The ATM switch according to claim 1, wherein each of the data units designates a priority and the additional data units which designate relatively high priorities are not in violation of the rate limitation.

4. The ATM switch according to claim 1, wherein each of the data units designates a priority and the additional data units which designate relatively low priorities are in violation of the rate limitation.

5. The ATM switch according to claim 1, wherein each of the data units designates a priority and the determination of whether the additional data units which designate relatively low priorities are in violation of the rate limitation is based on a "leaky bucket" algorithm.

6. The ATM switch according to claim 1, wherein if the backlog falls below the particular level, the output controls are arranged to lift the rate limitation.

7. The ATM switch according to claim 6, wherein the output controls lift the rate limitation by transmitting congestion control signals to the input controls.

8. The ATM switch according to claim 1, wherein the output controls impose the rate limitation by transmitting congestion control signals to the input controls.

9. The ATM switch according to claim 1, wherein each of the data units designates a priority and an input port and the determination of whether the additional data units which designate relatively low priorities and a particular input port are in violation of the rate limitation is based on a "leaky bucket" algorithm.

10. The ATM switch according to claim 9, wherein the particular input port is associated with a selected store whose backlog caused the rate limitation to be imposed.

11. An ATM switch, comprising:

a plurality of input ports for receiving data units on virtual connections, each of the data units designating a priority;

a plurality of output ports, each output port operatively associated with a plurality of output data stores and an output control;

a switch fabric for switching data units from any of the input ports to any of the output ports;

a rate filter capable of filtering at least one data unit, wherein the output data stores on an output side of the switch fabric are arranged to buffer data units for delivery to their associated output port, and the output controls are arranged to segregate the data units for storage in the output data stores based on their designated priorities and to monitor the backlog of buffered data units in one or more of said plurality of output data stores for delivery to their associated output ports and, if the backlog reaches a particular level, to enforce a rate limitation against additional data units for delivery to their associated output ports, wherein the additional data units in violation of the rate limitation are filtered by said rate filter so that they are not stored in the output data stores.

12. The ATM switch according to claim 11, wherein the additional data units which designate relatively high priorities are not in violation of the rate limitation.

13. The ATM switch according to claim 11, wherein the additional data units which designate relatively low priorities are in violation of the rate limitation.

14. The ATM switch according to claim 11, wherein the determination of whether the additional data units which designate relatively low priorities are in violation of the rate limitation is based on a "leaky bucket" algorithm.

15. The ATM switch according to claim 11, wherein if the backlog falls below a particular level, the output controls are arranged to lift the rate limitation.

16. The ATM switch according to claim 11, wherein the data stores are physically associated with output ports.

17. The ATM switch according to claim 11, wherein the rate limitation is enforced at inputs.

18. The ATM switch according to claim 11, wherein the rate limitation is enforced at outputs.

19. The ATM switch according to claim 11, wherein each output data store buffers data units having a distinct priority.

20. The ATM switch according to claim 11, wherein each output data store buffers data units having a distinct priority and input port combination.

21. The ATM switch according to claim 11, wherein the additional data units which designate relatively high priorities are not in violation of the rate limitation.

22. The ATM switch according to claim 11, wherein the additional data units which designate relatively low priorities are in violation of the rate limitation.

23. The ATM switch according to claim 11, wherein an input port and the determination of whether the additional data units which designate relatively low priorities and a particular input port are in violation of the rate limitation is based on a "leaky bucket" algorithm.

24. The ATM switch according to claim 23, wherein the particular input port is associated with a selected store whose backlog caused the selective filtering condition to be imposed.

25. An ATM switch, comprising:

a plurality of input ports for receiving data units on virtual connections, each of the data units designating a priority;

a plurality of output ports, each output port operatively associated with a plurality of output data stores and an output control;

a switch fabric for switching data units from any of the input ports to any of the output ports; and a rate filter capable of filtering at least one data unit, wherein the output data stores on an output side of the switch fabric are arranged to buffer data units for delivery to their associated output port, and the output controls are arranged to segregate the data units for storage in the output data stores based on their designated priorities and to monitor the backlog of buffered data units in one or more of said plurality of output data stows for delivery to their associated output ports and, if the backlog buffered in one or more selected stores reaches a particular level, to enforce a rate limitation against additional data units for delivery to their associated output ports, wherein the additional data units in violation of the rate limitation are filtered by said rate filter so that they are not stored in the output data stores.

26. An ATM switch, comprising:

a plurality of input ports for receiving data units on virtual connections, each of the data units designating a priority;

a plurality of output ports, each output port operatively associated with a plurality of data stores and an output control;

a switch fabric for switching data units from any of the input ports to any of the output parts; and a rate filter capable of filtering at least one data unit, wherein the data stores are arranged to buffer data units for delivery to their associated output port, and the output controls are arranged to segregate the data units for storage in the data stores based on their designated priorities and to monitor the backlog of buffered data units buffered in two or more of said plurality of data stores for delivery to their associated output ports and, if the backlog reaches a particular level, to enforce a rate limitation against additional data units for delivery to their associated output ports, wherein the additional data units in violation of the rate limitation are filtered by said rate filter so that they are not stored in the data stores.

27. The ATM switch according to claim 26, wherein the additional data units which designate relatively high priorities are not in violation of the rate limitation.

28. The ATM witch according to claim 26, wherein the additional data units which designate relatively low priorities are in violation of the rate limitation.

29. The ATM switch according to claim 26, wherein the determination of whether the additional data units which designate relatively low priorities are in violation of the rate limitation is based on a "leaky bucket" algorithm.

30. The ATM switch according to claim 26, wherein if the backlog falls below a particular level, the output controls are arranged to lift the rate limitation.

31. The ATM switch according to claim 26, wherein the data stores are physically associated with input ports.

32. The ATM switch according to claim 26, wherein the data stores are physically associated with output ports.

33. The ATM switch according to claim 26, wherein the rate limitation is enforced at inputs.

34. The ATM switch according to claim 26, wherein the rate limitation is enforced at outputs.

35. An ATM switch, comprising:

a plurality of input ports for receiving data units on virtual connections, each of the data units designating a priority;

a plurality of output ports, each output port operatively associated with a plurality of data stores and an output control;

a switch fabric for switching data units from any of the input ports to any of the output ports; and a rate filter capable of filtering at least one data unit, wherein the data stores are arranged to buffer data units for delivery to their associated output port, and the output controls are arranged to segregate the data units for storage in the data stores bused on their designated priorities and to monitor the backlog of buffered data units buffered in two or more of said plurality of data stores for delivery to their associated output ports and, if the backlog buffered in one or more selected stores reaches a particular level, to enforce a rate limitation against additional data units for delivery to their associated output ports, wherein the additional data units in violation of the rate limitation are filtered by said rate filter so that they are not stored in the data stores.

36. The ATM switch according to claim 35, wherein each data store buffers data units having a distinct priority.

37. The ATM switch according to claim 35, wherein each data store buffers data units having a distinct priority and input port combination.

38. The ATM switch according to claim 35, wherein the additional data units which designate relatively high priorities are not in violation of the rate limitation.

39. The ATM switch according to claim 35, wherein the additional data units which designate relatively low priorities are in violation of the rate limitation.

40. The ATM switch according to claim 35, wherein the determination of whether the additional data units which designate relatively low priorities are in violation of the rate limitation is based on a "leaky bucket" algorithm.

41. The ATM switch according to claim 35, wherein if the backlog falls below a particular level, the output controls are arranged to lift the rate limitation.

42. The ATM switch according to claim 35, wherein the data stores are physically associated with input ports.

43. The ATM switch according to claim 35, wherein the data stores are physically associated with output ports.

44. The ATM switch according to claim 35, wherein the rate limitation is enforced at inputs.

45. The ATM switch according to claim 35, wherein the rate limitation is enforced at outputs.

46. The ATM switch according to claim 35, wherein an input port and the determination of whether the additional data units which designate relatively low priorities and a particular input port are in violation of the rate limitation is based on a "leaky bucket" algorithm.

47. The ATM switch according to claim 35, wherein the particular input port is associated with a selected store whose backlog caused the selective filtering condition to be imposed.

* * * * *